Figure 9:
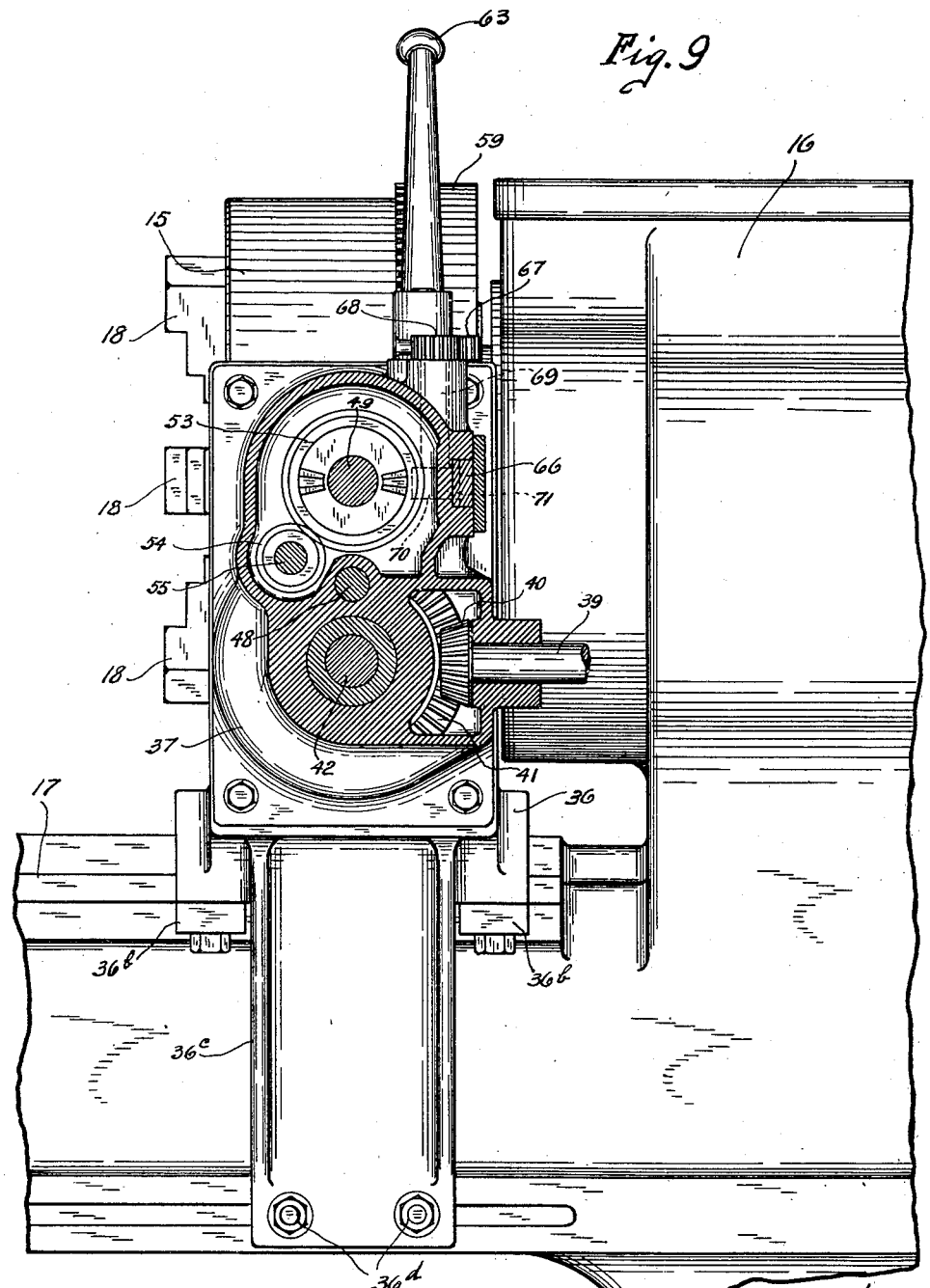

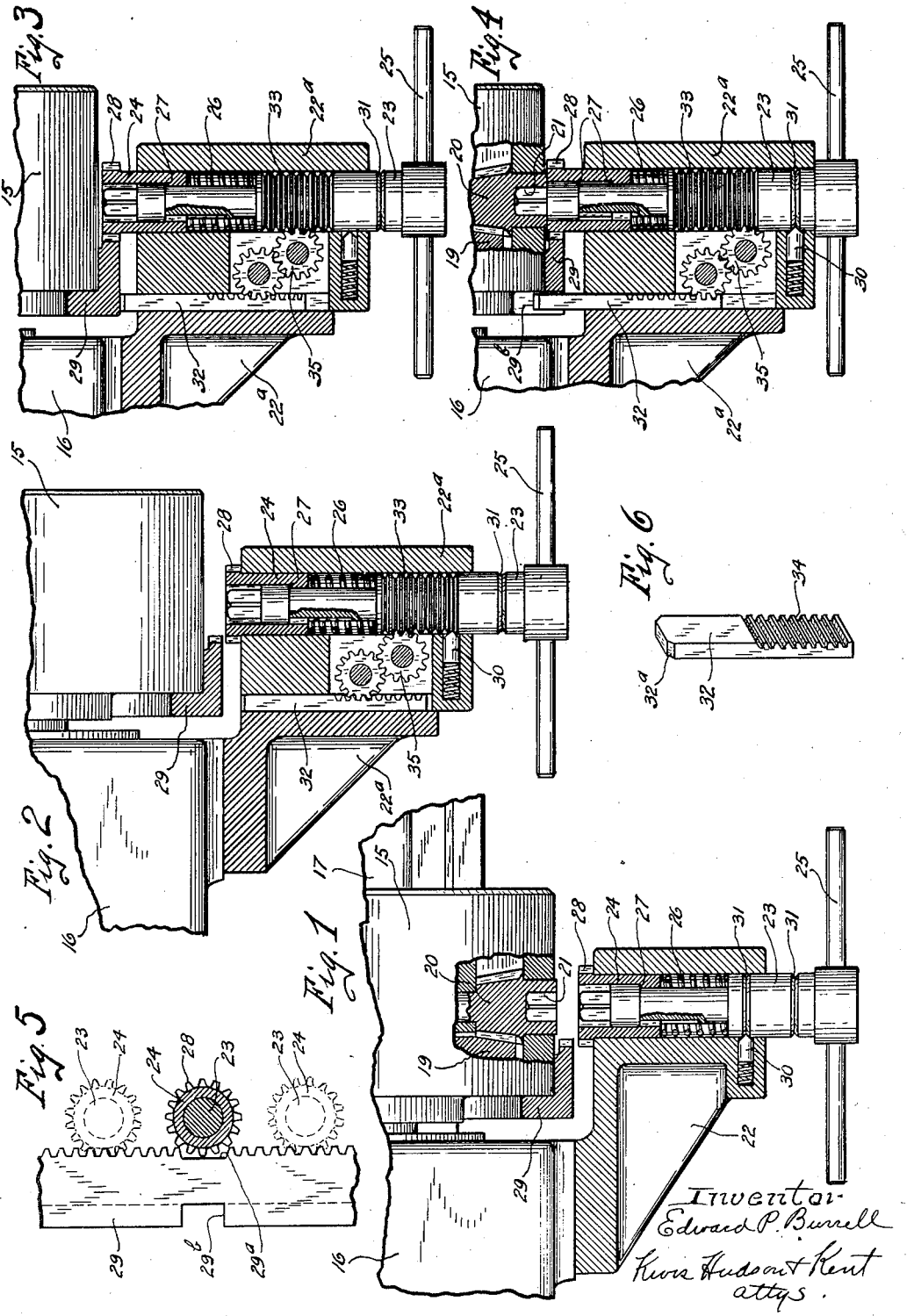

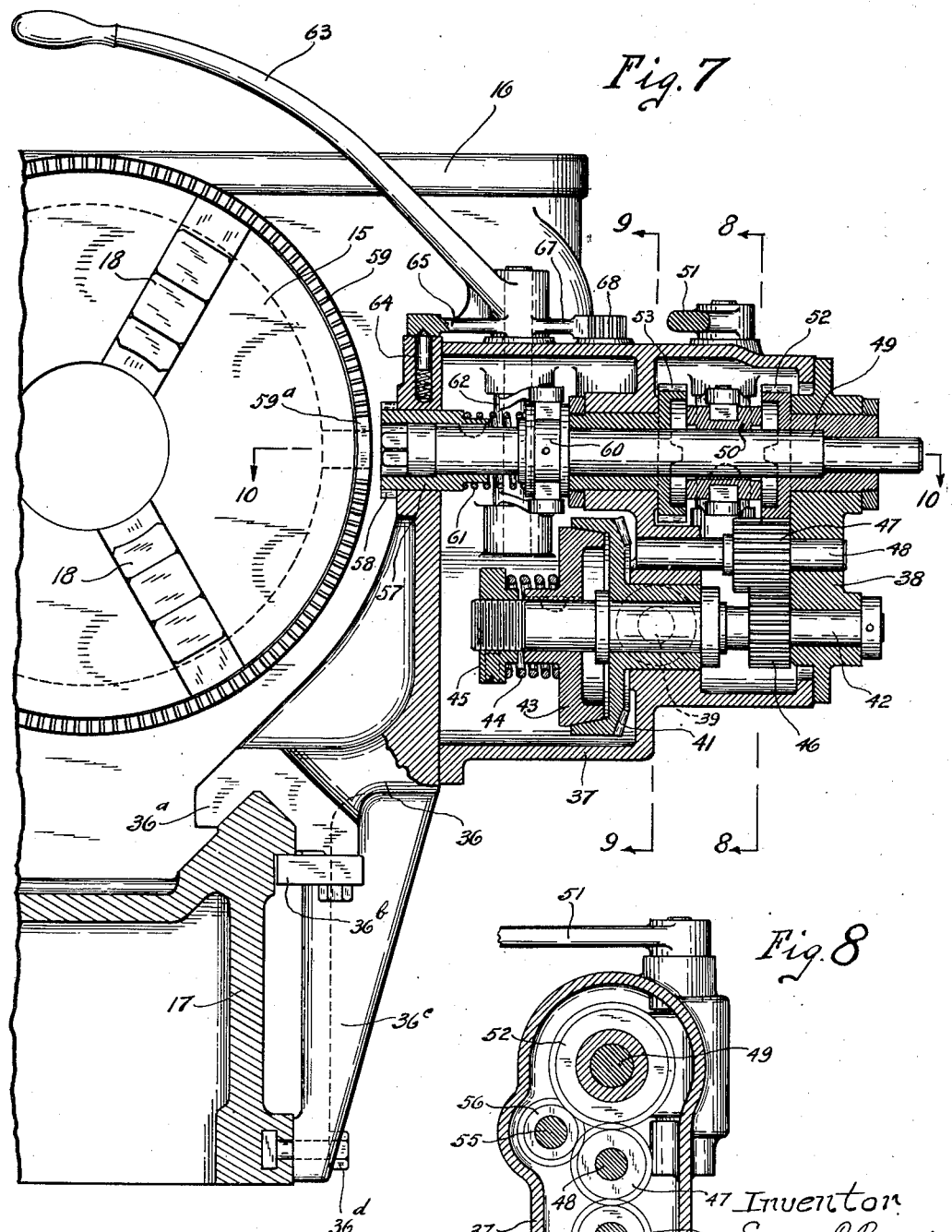

Aug. 30, 1932.  E. P. BURRELL  1,874,888
CHUCK CLOSING AND OPENING MECHANISM
Filed May 28, 1930   4 Sheets-Sheet 3

Aug. 30, 1932.  E. P. BURRELL  1,874,888
CHUCK CLOSING AND OPENING MECHANISM
Filed May 28, 1930  4 Sheets-Sheet 4
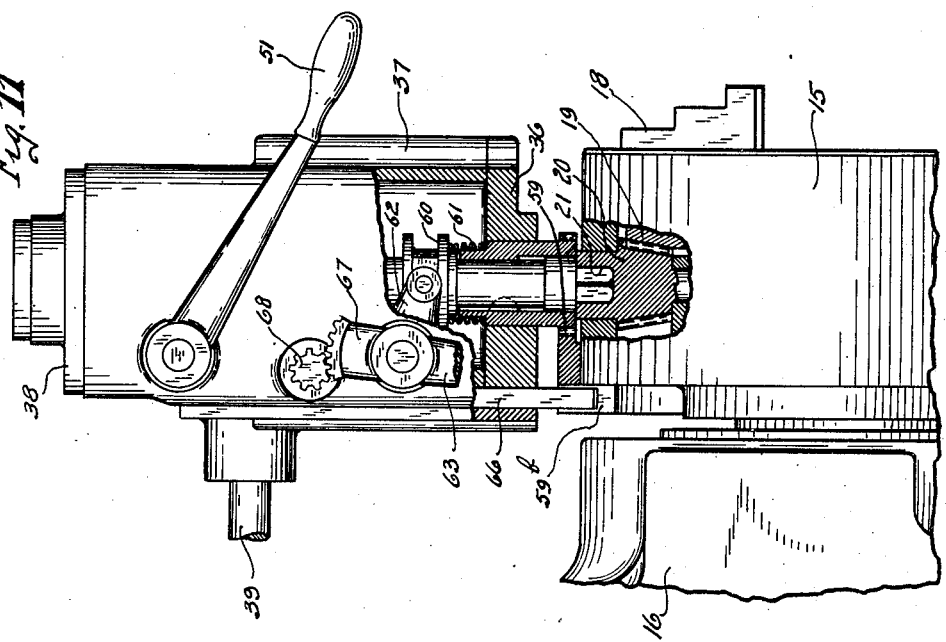
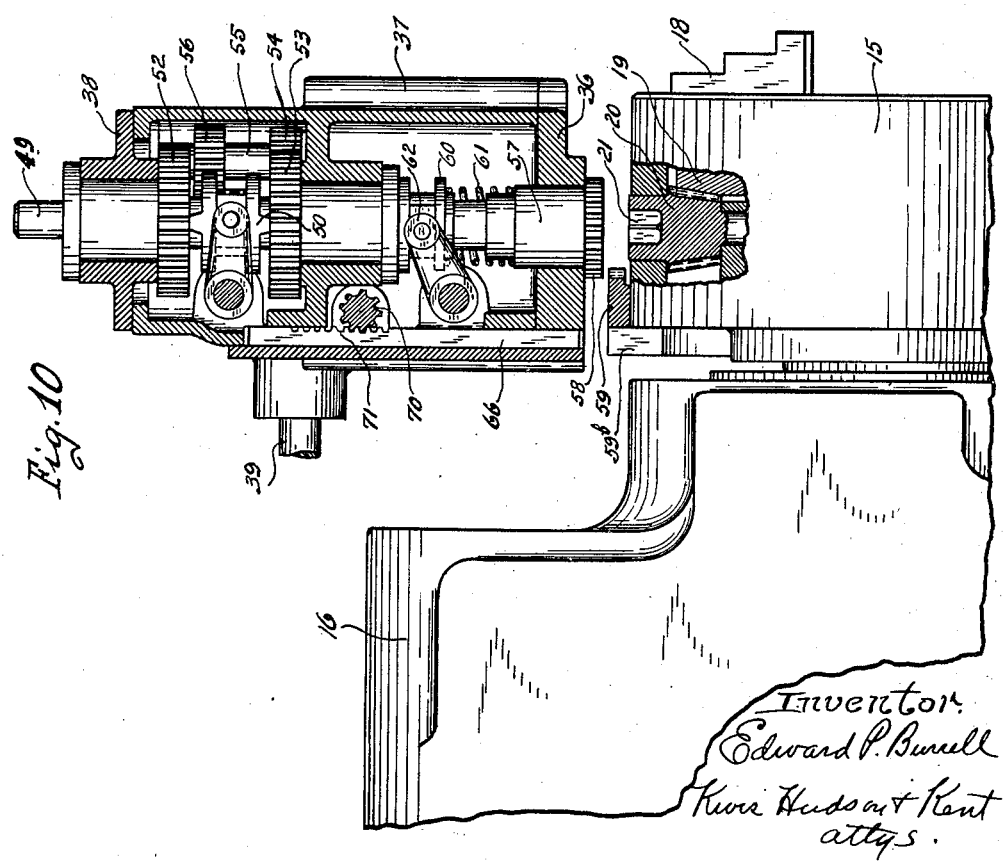

Patented Aug. 30, 1932

1,874,888

UNITED STATES PATENT OFFICE

EDWARD P. BURRELL, OF SHAKER HEIGHTS, OHIO, ASSIGNOR TO THE WARNER & SWASEY COMPANY, OF CLEVELAND, OHIO, A CORPORATION OF OHIO

CHUCK CLOSING AND OPENING MECHANISM

Application filed May 28, 1930. Serial No. 456,545.

This invention relates to chuck closing and opening mechanisms, and particularly to power-operated mechanisms, although the principle of the invention may be adapted for mechanisms which are hand-operated.

It is common practice to close and open a chuck by inserting a wrench or equivalent device into one of several spaced sockets in the periphery of the chuck and then rotate a jaw actuating member. These jaw actuating members are generally in the form of pinions which engage and turn a member, usually in the form of a scroll, which in turn transmits inward and outward movements to the jaws, one of the said pinions being provided at each of the sockets, usually three in number, spaced 120° apart, and each having a socket to receive the wrench. Before the wrench is inserted in one of these sockets, it is necessary to rotate the chuck body to properly position the socket, this being desirable, if not necessary, when the chuck is closed and opened by hand, and it is essential when the chuck closing and opening mechanism is power-operated, for in that event the power actuated wrench has a fixed location on the machine and is moved inwardly to chuck engaging position and rotated about a fixed axis.

The proper positioning of the chuck body so that the socket is in accurate alignment with the wrench in order that the wrench might slide into engagement with the jaw operating member has heretofore always been done by hand and is time consuming. Additionally, a considerable turning force is required to be applied to the chuck body to turn it until the socket is in alignment with the wrench, especially as the work spindle on which the chuck is mounted is at such times connected up to a gear train in the head of which the spindle is a part. With some chucks, particularly the smaller sizes, it is convenient or possible for the operator to turn the chuck body by hand, but with the larger chucks it may be necessary for the operator to turn the chuck under power, i. e., through the mechanism which normally rotates it. This requires the operator to engage and disengage the main driving clutch and often considerable time is expended in getting the proper alignment between the socket in the chuck body and the wrench.

The principal object of the present invention is to do away with the necessity of turning the chuck either manually or by the gear train to align the socket with the wrench, as has been necessary heretofore.

Further, the invention aims to provide means whereby the relative movement between the chuck and wrench to bring about the alignment of the socket and wrench may be accomplished by the wrench itself or by the chuck closing and opening mechanism.

A still further object is to cause automatic alignment of the socket and wrench simply by the inward and rotative movements imparted to the wrench so as to make it unnecessary for the operator to pay any attention to the aligning preliminary to the closing or opening operation.

A still further object is to provide, in connection with a wrench constructed so that it may first align the socket of the chuck with the wrench, a positioning or piloting member which during the inward and rotative movements of the wrench keeps the wrench out of engagement or in definite spaced relation with the chuck body until the said alignment takes place and then accurately centers the socket and wrench so that the latter may quickly and silently slide into engagement.

My invention finds its greatest utility in connection with a power-operated wrench, that is to say, one wherein the wrench is rotated by power derived from a motor or from the headstock or other part of the machine, but it may be employed advantageously particularly in some machines having a hand-operated wrench, and, accordingly, I have illustrated my invention applied both to a power-operated and to a hand-operated wrench.

In the drawings, Fig. 1 is a detail view, partly in section, showing a portion of the chuck and a hand-operated wrench embodying the chief features of my invention and here shown in its most simplified form, said wrench being positioned in alignment with the socket in the chuck; Fig. 2 is a similar view showing a slight modification wherein the wrench is composed of the elements shown in Fig. 1, and, in addition, the positioning and piloting device, the wrench and socket being shown out of alignment; Fig. 3 is a fragmentary sectional view of Fig. 2 showing the pinion of the wrench engaged with a special gear provided on the chuck body but with the wrench itself held in spaced relation or out of engagement with the chuck body by the positioning member; Fig. 4 is a similar view showing the parts engaged for the closing and opening operation; Fig. 5 is a detail view showing the pinion which forms a part of the wrench and a portion of the special gear provided on the chuck body, the gear being shown by solid lines in the position which it occupies when the alignment between the socket and the wrench has occurred and by dotted lines in positions out of alignment; Fig. 6 is a perspective view of the positioning member forming a part of the wrench and adapted to slide into engagement with the chuck body to center the socket of the chuck body with the wrench; Fig. 7 shows my invention applied to a power-operated wrench, this view showing a portion of the head of a lathe and a portion of the front of the chuck and showing the chuck closing and opening mechanism in vertical section, the section being taken centrally through the closing and opening mechanism; Fig. 8 is a transverse sectional view substantially along the line 8—8 of Fig. 7; Fig. 9 is a rear view showing a portion of the head and a portion of the lathe bed and showing the chuck closing and opening mechanism in section substantially along the line 9—9 of Fig. 7; Fig. 10 is a plan view showing a portion of the head, a portion of the chuck, and the chuck closing and opening mechanism, the portion of the chuck and the closing and opening mechanism being in section substantially along the line 10—10 of Fig. 7, the parts being here shown with the wrench in its normally retracted position; and Fig. 11 is a plan view of the same with portions in section, the wrench being here shown in position for moving the jaws.

The chuck, which is designated 15 in the different views, may be applied to the spindle of any suitable type of machine, such as a lathe or other machine tool, a portion of the head of which is shown at 16. I have shown at 17 a portion of the bed of the machine tool, but all these parts do not per se involve the invention and may be constructed in any suitable way. Additionally, of course, the machine may be of the horizontal type or of the vertical type. A standard form of chuck may be employed with slight additions or modifications to be referred to, which chuck is designed to be mounted on the work spindle in the usual way and will be provided with a suitable number of work gripping jaws 18 (see Figs. 7 and 9). Generally these jaws are moved radially inward or outward by a scroll, a portion of which is indicated at 19 in some of the figures, and this scroll may, as customary, be turned in one direction or the other by one of a number of pinions 20, usually three in number spaced 120° apart, which pinions are mounted in the peripheral portion of the chuck body and are mounted to turn on radially disposed axes, each pinion being at its outer end substantially flush with the periphery of the chuck body and at its outer end being formed with a socket 21 of suitable form to receive the end of a wrench which is adapted to turn the pinion and thus turn the scroll and move the jaws.

With both the power-operated and the manually operated forms of chuck closing and opening mechanism, the wrench is preferably mounted in a suitable supporting member which will be so located with reference to the chuck that it will not be in the way of any of the parts of the machine. When the chuck closing and opening mechanism is manually operated, the support referred to may be mounted at the front of the machine, as here illustrated, or at the top of the head so as to be within convenient reach of the operator. In Fig. 1 the support, which is designated 22, is secured to the head 16, with the wrench mounted opposite the periphery of the chuck. The wrench here shown includes two main movable members 23 and 24. The member or part 23 is mounted for endwise movement toward and from the chuck body in a socket formed in the support 22 and is provided at its outer end with a suitable handle 25 by which it may be moved inward and rotated. A portion of the member 23 is reduced in size, and at its inner end is squared or otherwise formed to correspond in shape with the sockets 21 of the pinions 20. The member 24 is in the form of a sleeve in which the reduced part of the member 23 is slidable, and in the bore of the support between the outer end of the member 24 and a shoulder on the member 23 is a spring 26 which normally holds a shoulder on the sleeve 24 in engagement with a shoulder formed on the wrench member 23, these shoulders being indicated at 27 in Figs. 1, 2, 3 and 4.

At the inner end of the sleeve 24 is a pinion 28 which, when the two parts of the wrench are moved inwardly as hereinafter explained, is adapted to engage a gear or annular rack 29 fixed to the chuck body and extending entirely around the periphery thereof. This gear is toothed for its full periphery, except at given spaces 29ª, opposite each of the pinions 20 of the chuck, one of these spaces being indicated in Fig. 5, these untoothed spaces being of sufficient length to allow the pinion, when it occupies one of the spaces, to turn freely without turning the gear 29 and the chuck body. Normally, the parts of the wrench or chuck closing and opening mechanism are in the relative positions shown in Fig. 1, being held in the position shown by a spring point 30 engaging a groove 31 of the wrench member 23, and when the parts of the wrench have been positioned that they may turn the pinions 20 and move the jaws, the spring point will engage an outer groove 31 of the wrench member 23 so as to hold the parts in the relative positions just stated while the operator is turning the handle 25 of the wrench. The method of operation and the different positions that the parts of the wrench assume in the operation of the wrench will be explained after the slightly modified construction shown in Fig. 2 is described.

The construction shown in Fig. 2 is identical with that shown in Fig. 1 except that the support for the wrench, which support is here designated 22ª, is, for convenience of assembly, made of two parts. Additionally, I have provided in the support a positioning member 32 which is slidably mounted in the support and is adapted to be moved inwardly into engagement with the annular gear 29 of the chuck when the wrench is moved inwardly. To bring this about, a portion of the periphery of the wrench member 23 has circular rack teeth 33 formed thereon and the positioning member 32 has rack teeth 34 formed thereon. Movement is transmitted from the member 23 to the member 32 by a pair of pinions 35, which pinions are in engagement and one of which engages the rack teeth 33 while the other engages the rack teeth 34. The inner end of the positioning member 32 is preferably slightly beveled, as shown at 32ª, and its beveled end is adapted to engage in slots 29ᵇ formed in the gear or annular rack 29 of the chuck body, these slots being radially disposed one opposite each of the pinions 20 so that when the chuck body has been rotated a predetermined amount by the wrench the beveled end of the positioning member 32 will slide into engagement with one of these slots and accurately center the socket 21 of one of the pinions 20 with the wrench (see Figs. 4 and 5).

The operation of the devices shown in Figs. 1 to 5 is as follows:

When it is desired to close or open the chuck, the operator will slide the wrench inwardly toward the chuck body from the inoperative position shown in Figs. 1 and 2. During this movement, both parts 23 and 24 of the wrench move inwardly by reason of the spring 26, and during the initial movement the gear formed on the inner end of the sleeve 24 will slide into engagement with the gear or annular rack 29 of the chuck body, it being assumed that the pinions 20 of the chuck body are displaced circumferentially from the wrench, as is almost invariably the case when the chuck comes to a stop or is in the position indicated by dotted lines in Fig. 5. At the same time that the operator gives the inward movement to the two members 23 and 24 of the wrench, the positioning member 32, if it is provided, as in the constructions shown in Figs. 2, 3 and 4, is moved inward until the inner end engages the smooth periphery of the gear 29, the parts now being in the position shown in Fig. 3. If the positioning member is not provided in the device, as in the construction shown in Fig. 1, the inward movement of the two parts of the wrench is stopped by the engagement of the inner end of the wrench with the periphery of the chuck body, the gear 28 sliding into engagement with the rack 29 as before. The operator may now turn the wrench in either direction, depending upon whether the chuck is to be closed or opened, in fact he may turn it at the same time he moves the wrench inward. Both parts 23 and 24 of the wrench turn for the reason that the sleeve 24 is connected to the part 23 by a key. The effect of this rotation is, first, to turn the chuck body until one of the untoothed portions 29ª of the gear 29 comes opposite the gear 28, whereupon the rotation of the wrench ceases to rotate the chuck, but the chuck has now been positioned so that one of the pinions 20 of the chuck is in alignment with the wrench so that the wrench may slide into engagement with the socket of the pinion 20, the parts being in the position shown in Fig. 4, and the continued rotation of the wrench will move the jaws so as to either close or open the chuck, as the case may be. In the event that the chuck is not provided with the positioning device 32, the inner end of the wrench or the outer ends of the sockets of the pinions may be slightly beveled so that the engagement of the end of the wrench with the socket of the pinion will be assured, but this bevel need not be employed in the construction shown in Figs. 2 to 4 for, in that case, as soon as the gear 28 moves into the untoothed portion of the gear 29, the positioning device 32, which meanwhile has been slidingly engaging the outer surface of the gear 29 and has held the inner end of the wrench member 23 slightly out of engagement with the periphery of the chuck body, slides into engagement with one of the slots 29ᵇ of the gear 29 and accurately centers the socket of the pinion 21 with the axis of the wrench.

After the socket of the chuck and the wrench have been aligned and the wrench proper has been moved into the socket, the spring 26 is compressed, but when the wrench is the full distance in the socket, the spring point 30 engages in the outer groove 31 of the wrench member 23, thus holding the wrench in the socket so that it is unnecessary for the operator to press the outer member inward or to do it uninterruptedly while the handle is being turned during the chuck closing or chuck opening operation. After the chuck has been closed or opened, as the case may be, the operator disengages the wrench from the socket of the pinion by a slight outward pull on the handle until the spring point 30 engages in the inner groove 31, whereupon the parts will be restored to the normal inoperative position shown in Figs. 1 and 2 with both parts of the wrench entirely clear of the chuck.

The same principle of operation is embodied in the power-operated chuck closing and opening mechanism, but with a slightly different and additional mechanism. When this mechanism is power-operated, the unit is preferably in the form of an attachment which will be applied to a suitable part of the machine so as to be out of the way of the other operating parts. In this instance, the attachment is on the rear side of the machine and is shown secured to the bed, but this arrangement is not essential as for in some constructions it may be supported on the head either on the rear side or on the top side thereof. With the construction illustrated in Figs. 7 to 11, the attachment includes a supporting bracket 36 which is supported on the rear way of the bed and on the rear side below the rear way. This bracket has an upper portion 36$^a$ which fits on the rear way and is held thereto by clamps 36$^b$ and the bracket has a downward extension 36$^c$ held to the rear side of the bed by T-bolts 36$^d$, the heads of which engage in a slot of the bed. By loosening the clamps 36$^b$ and the T-bolts 36$^d$, it is possible to adjust the attachment lengthwise of the bed to properly position it for different lengths of chucks. The principal portion of the closing and opening mechanism of the attachment is in a housing the front part of which is formed by an upward extension of the bracket 36 and the body of which is formed by the housing proper 37 the rear side of which is closed by a plate 38 constituting a bearing support for shafts to be referred to, along with bearing supports formed on the interior of the housing 37.

A power shaft which, in this instance, extends into the side of the housing, is shown at 39 (see particularly Figs. 9, 10 and 11, where this shaft is indicated by full lines, and in Fig. 7, where it is shown by dotted lines). This shaft, which is adapted to rotate the wrench, including the part which actuates the jaw moving mechanism of the chuck, as well as the gear which rotates the chuck to bring the wrench and socket of the chuck into alignment, may be driven in any suitable way, as, for example, by an electric motor or air motor which may be mounted on and form a part of the attachment, in which event it may be secured to the bracket beneath the housing 37. This shaft may be otherwise driven, as, for example, by a suitably driven shaft or gear of the machine to which the attachment is applied. If the attachment is applied to a lathe, the shaft 39 may be connected to and driven by a shaft in the headstock, as, for example, a constant speed shaft, as illustrated in a copending application filed in the name of Burrell and Bogart, Serial No. 268,911, filed April 10, 1928. This shaft has at its inner end a bevel pinion 40 which engages a bevel gear 41 loose on a shaft 42 mounted in the housing. This bevel gear 41 forms one part of a slipping clutch, the companion part 43 of which has a sliding key connection with the shaft 42 and is held yieldingly in engagement with the gear 41 by a spring 44 which may be adjusted by an adjustable abutment 45 in the form of a nut on the shaft 42. This slipping clutch is adjusted so as to slip when the transmitted torque reaches a predetermined value so that the rotation of the wrench will be stopped when the jaws of the chuck have been closed onto a work piece even though the power shaft continues to rotate after the chuck is closed.

Attached to the shaft 42 is a pinion 46 engaging a wide faced pinion 47 on a shaft 48 also mounted in the housing. This shaft 48 is arranged adjacent the wrench or wrench shaft 49 to which is connected by a sliding key a clutch member 50 adapted to be shifted by a clutch lever 51 into engagement with either of two gears 52 and 53 which are normally loose on the shaft on opposite sides of the clutch member 50. Gear 52 engages the wide faced pinion 47, while gear 53 meshes with an idler pinion 54 on an idler shaft 55 having a pinion 56 which also engages the wide faced pinion 47. Obviously, when gear 52 is clutched to the wrench shaft 49 it will rotate in one direction, and when gear 53 is clutched to the wrench shaft it will be rotated in the opposite direction.

The wrench shaft is adapted to be moved through the forward wall of the housing and is normally held in the position shown in Fig. 7 a short distance away from the periphery of the chuck. Surrounding the forward portion of the wrench and connected thereto by a sliding key is a sleeve 57 which is provided at its forward end with a gear 58 which is adapted to rotate the chuck, as in the first instance, to align the wrench or wrench shaft with a socket in one of the pinions 20 of the chuck, when this gear engages the gear or annular rack 59 which extends around the body of the chuck, precisely as in the constructions first described. Normally, the gear 58 is in the position shown in Fig. 7 so as to be clear of the gear 59 on the chuck, as shown in both Figs. 7 and 10.

On the shaft 49 is provided a shoe ring or grooved collar 60 which is pinned or otherwise secured to the shaft, and between this collar and the sleeve 57 is a spring 61 corresponding to the spring 26 of the constructions first described. This collar 60 is engaged by the shoes of a yoke 62 adapted to be shifted by a lever 63. Both this lever and the lever 51 will project over the head or the operating portions will be otherwise so positioned that they will be within convenient reach of the operator standing in front of the machine.

When it is desired to close or open the chuck, the operator will throw the clutch lever 51 in one direction or the other, depending upon whether the chuck is to be closed or opened. This causes the power shaft, through the slipping clutch, to rotate the wrench 49 and the gear 58. Then the operator will actuate the lever 63 so as to cause the gear 58 to slide into engagement with the gear 59 on the chuck and to rotate the chuck until the gear 58 comes into engagement with one of the untoothed portions, one of which is shown at 59ª in Fig. 7, which corresponds to the untoothed portion 29ª shown in Fig. 5, whereupon, by continued movement of the lever 63, the forward end of the wrench which, while the gear 58 was rotating the chuck, was either held entirely out of engagement with the chuck body or was riding on the surface of the chuck body, depending upon whether or not the positioning bar is used, will slide into engagement with the socket 21 of one of the pinions 20 of the chuck opening and closing means. Thus the rotating wrench, with the associated gear 58, when moved forwardly, first turns the chuck so as to align the socket of one of the pinions 20 with the wrench and then moves forward further so that its rotation may be transmitted to the pinion 20 and either close or open the chuck, depending upon the direction in which the wrench is rotated. As soon as the chuck is closed or opened, as the case may be, and the transmitted torque reaches a predetermined value, the clutch slips and the operator will then swing the levers 51 and 63 back to their normal or neutral positions. This will withdraw the wrench from the chuck, restoring the parts to the position shown in Figs. 7 and 8, and stops the rotation of the wrench.

If desired, a device corresponding to the function of the spring point 30 of the first described construction may be employed to hold the wrench in normal position when it is not being used, and also to hold the wrench in chuck closing or opening position without requiring that the operator keep his hand on the lever 63. This is illustrated in Fig. 7, wherein I have shown a spring point 64 engaging a part 65 movable with the lever 63, and in this instance constituting an extension of the hub of the lever.

If desired, a slight bevel may be provided on the forward end of the wrench or on the outer end of the socket 21 of one of the pinions 20 or on both to assure the sliding engagement of the wrench with the socket when they have been substantially aligned through the action of gear 58 of the wrench on the gear 59 of the chuck, or a positioning bar 66 corresponding to the bar 32 of the construction of Figs. 2, 3 and 4 may be employed. This bar 66, as shown, is mounted for sliding movement in the housing of the attachment alongside the wrench and is designed to be moved inwardly by the lever 63 coincidentally with the inward movement of the wrench and at the same speed as the latter. In this instance, the lever has an extension 67 with a toothed sector at its outer end and engaging a pinion 68 located at the top of the housing at the upper end of a vertical shaft 69 whose lower end is provided with a second pinion 70 engaging rack teeth 71 formed on the positioning bar 66 (see Figs. 9 and 10). When this positioning bar is employed, as the wrench is moved inwardly by the lever 63 the bar will engage the outer surface of the gear 59 on the chuck body and will hold the forward end of the wrench slightly away from the surface of the chuck body, and, as in the construction shown in Figs. 2, 3 and 4, when the chuck has been turned by the gear 58 of the wrench and gear 59 of the chuck until the socket of one of the pinions 20 of the chuck is in alignment or substantially in alignment with the wrench, the inner end of this positioning bar, which inner end may be slightly beveled, slides into engagement with a correspondingly shaped slot, indicated at 59ᵇ in Fig. 11, of the gear 59 so as to very accurately center the socket of the chuck with the axis of the wrench before the forward end of the wrench enters the socket, it being understood that one of these slots 59ᵇ will be provided in the gear 59 opposite each one of the untoothed portions 59ª as in the construction illustrated in Figs. 2 to 4.

It will be understood, of course, that the operator will actuate the chuck closing and opening mechanism only when the chuck is not rotating by its usual driving mechanism, that is to say, when the main clutch controlling the normal rotation of the chuck is disengaged. To avoid the likelihood of the operator, through inadvertance or ignorance, operating the lever 63 when the chuck is being rotated, I may provide an interlock between the lever 63 and the main clutch lever of the machine so as to make it impossible for the operator to shift the lever 63 unless the main clutch is disengaged, as in the Burrell and Bogart application referred to above, but as this interlock forms no part of the present invention, it is not illustrated.

Thus it will be seen that the objects of the invention stated in the earlier part of the specification are attained with a chuck closing and opening mechanism which may be operated either manually or by power.

Likewise, it will be apparent that the invention is not confined in its use to a lathe, but that it may be in the form of an attachment applied in different ways or built into the machine if desired, and that the invention is not confined to a chuck having the precise details of construction herein illustrated.

While I have shown several ways of carrying out the invention, with both hand and power-operated mechanisms, I do not desire to be confined to the precise details or arrangements shown but aim in my claims to cover all modifications which do not involve a departure from the spirit and scope of the invention as defined in the appended claims.

Having thus described my invention, I claim:

1. In combination with a work holder having work engaging means, a wrench for actuating said means, a support for the wrench, and means forming an operative connection between the work holder and wrench to move one relative to the other to position it to permit operation of the wrench.

2. In combination with a work holder having work engaging means, a closing and opening member for said holder having means for shifting the work holder relative to said member and for operating the work engaging means.

3. In combination with a work holder having work gripping means and provided with a peripheral socket, a device engageable with said socket for operating the work gripping means having a part engageable with a part of the work holder to shift the same before engaging the socket.

4. In combination with a chuck having work gripping jaws and jaw moving means, a closing and opening member having a part engageable with one or more points of the chuck to close or open the chuck, and having another part for moving the chuck to cause alignment between one of said points of the chuck and said first part of the member prior to the engagement of said first part with the chuck.

5. In combination with a chuck having work gripping jaws and means for moving the jaws, a peripheral socket, a wrench insertible in said socket and having means cooperating with the chuck to shift the latter to align the socket and wrench before engaging the jaw moving means.

6. In combination, a chuck and a chuck closing and opening wrench, the chuck having jaws and jaw moving means, and the chuck and wrench having cooperating members to move the chuck and wrench relatively to each other preliminary to engagement of the wrench with the jaw moving means.

7. In combination, a chuck having jaws and jaw operating means, and a wrench movable into and out of engagement with the jaw operating means and adapted to actuate the same, a support for the wrench, the chuck and wrench having gearing by which one may be moved relatively to the other to position it for operation by the wrench.

8. In combination, a chuck having work gripping means, a member for actuating said means, a support for said member, and means by which the rotation of said member first positions the chuck relative to said member to permit the engagement of the latter with the work gripping means.

9. In combination with a chuck having jaws and jaw moving means, a chuck closing and opening mechanism including a rotatable wrench movable into and out of the periphery of the chuck, said chuck and said mechanism having means whereby the rotation of the wrench moves the chuck and wrench relatively to each other before the latter engages the jaw moving means.

10. A wrench for engaging a portion of a chuck so as to close or open the same, having two relatively movable portions including a portion for relatively moving the chuck and wrench so as to position one of said members for operation by the wrench, and another portion for actuating the jaws.

11. A wrench for opening or closing a chuck, said wrench including two movable members, one being in the form of a gear for causing a relative movement between the chuck and wrench to position one of said parts for operation by the wrench, and the other being engageable with the jaw moving means.

12. The combination of a chuck and a chuck closing and opening mechanism, the chuck having jaw moving means and a gear member, and said mechanism having a part engageable with the jaw moving means and having a gear member engageable with the first named gear member to cause the chuck and said mechanism to be moved relatively to each other and thereby position the same for the closing or opening operation.

13. The combination of a chuck and a chuck closing and opening mechanism, the chuck having jaw moving means and a gear member, and said mechanism having a part engageable with the jaw moving means and having a gear member engageable with the first named gear member to cause the chuck and said mechanism to be moved relatively to each other and thereby position the same for the closing or opening operation, said two parts of the mechanism being so mounted that one is movable relative to the other to permit successive engagement with corresponding members of the chuck.

14. In combination with a chuck having jaw moving means and a peripheral wrench engaging socket, a chuck closing and opening mechanism including a rotatable wrench, means for moving it inward while it is rotating, and means whereby during the rotation and initial part of the inward movement the chuck is turned to position the socket with respect to the wrench so that the wrench will engage in said socket during the final inward movement and actuate the jaw moving means.

15. In combination, a work holder and a closing and opening mechanism therefor, the work holder having work engaging means, the closing and opening mechanism including a wrench insertible in the work holder and a positioning member engageable with a portion of the work holder to align a given point in the periphery thereof with the wrench before insertion of the latter in the work holder.

16. In combination with a work holder having work engaging means, a device for operating said means and including a member engageable with the work holder, and a second member for holding the first member out of engagement with the work holder until a predetermined part of the work holder is opposite the device.

17. In combination with a work holder having work engaging means, a device for operating said means and including a member for engagement with the work holder, and a second member for engaging the work holder to keep the first member out of engagement with the same until a predetermined part of the work holder is opposite the device.

18. In combination with a work holder having work engaging means, a device for operating the said means having a part engageable with a part of the work holder to shift the same, a second part engageable with the work holder to center the same with respect to said device, and a third part for operating the work engaging means.

19. In combination with a work holder having work engaging means, a device for operating the said means, said device having a gear engageable with the work holder to move the same, a part engageable with the work holder to align the work holder with said device, and a wrench for moving the work engaging means.

In testimony whereof, I hereunto affix my signature.

EDWARD P. BURRELL.